Patented June 8, 1948

2,443,160

UNITED STATES PATENT OFFICE 2,443,160

MANUFACTURE OF WATER - INSOLUBLE SALTS OF ALKYL DITHIOCARBAMIC ACIDS

Dudley M. Gallagher and Leslie A. Gillette, Wyandotte, Mich., assignors to Sharples Chemicals Inc., Philadelphia, Pa., a corporation of Delaware No Drawing. Application June 27, 1944, Serial No. 542,449

9 Claims. (Cl. 260—429)

The present invention pertains to the manufacture of water-insoluble salts of alkyl substituted dithiocarbamic acids, and includes features useful in the manufacture of such compounds. In the manufacture of compounds of this type it is customary to react carbon disulfide, an amine and a water-soluble base to obtain first a water-soluble salt of the substituted dithiocarbamic acid, and thereafter to react the resulting aqueous solution with a water-soluble compound containing the metal constituent of the water-insoluble salt of the substituted dithiocarbamic acid which is to form the final product. Thus, in the manufacture of the zinc salt of dimethyl dithiocarbamic acid, it is customary to form the corresponding sodium salt by reaction of carbon disulfide, dimethyl amine and sodium hydroxide, and thereafter to react the resulting aqueous solution with zinc chloride to effect substitution of zinc for the sodium of the original salt by metathesis, the zinc salt of the dimethyl dithiocarbamic acid being precipitated from solution as it is formed. Salts of other substituted dithiocarbamic acids may be prepared in this same way, and the present invention provides an improvement in manufacture of any of these products. It is believed, however, that it has primary importance in the manufacture of salts of the alkyl dithiocarbamic acids, and it will be described specifically in that connection.

The reaction between sodium salts of alkyl dithiocarbamic acids and zinc chloride may be illustrated by the following equation:

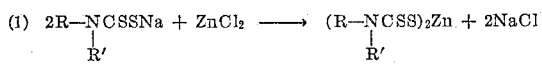

in which R represents an alkyl radical and R' represents an alkyl radical or hydrogen. This same general type of reaction may be employed in treatment of other water-soluble salts of alkyl dithiocarbamic acids, including the water-soluble alkali salts and other such salts, to convert these water-soluble salts into the corresponding water-insoluble salts. Thus, the various water-soluble salts of the mono- and di-alkyl dithiocarbamic acids may be treated with water-soluble compounds of zinc, lead or copper, including zinc chloride, zinc sulfate, lead nitrate, copper sulfate, etc., to form the alkyl dithiocarbamic acid salts containing these other metals as substituents for the metal constituent of the original water-soluble salt.

The process of the invention has been especially useful in the manufacture of the salts of the various alkyl dithiocarbamic acids containing from 1–5 carbon atoms in their alkyl radical or radicals, and containing zinc, lead or copper as their metal constituent, since compounds of this character have found especial utility in the manufacture of rubber products. Improvement in the manufacture of the salts of these metals with dimethyl-, diethyl- and dibutyldithiocarbamic acids has constituted a particular object of the invention.

The present invention rests upon the discovery that an important improvement in the yield of the product can be obtained when the reaction is carried out in the presence of an agent which, when in aqueous solution, is capable of reducing surface tension. The agent in question may be chosen from a wide class of compounds having this property, including the various agents used in the arts for washing, wetting, emulsifying and similar operations. It may, for example, be an ordinary soap, an emulsifying agent such as red oil, or one of the various types of sulfur-containing detergents, emulsifying agents or wetting agents which have come into prominence in recent years. Such agents will be referred to hereinafter in the specification and claims as "surface active agents." Among the various agents of this type which may be used in the practice of the invention, red oil (a product consisting primarily of oleic acid) and the sodium salt of diamyl naphthalene sulfonic acid have been found to effect particularly good improvements in yield.

The surface active agents will ordinarily be used in amounts varying between 0.01% and 2% based upon the weight of the expected dry product (as calculated by stoichiometry). The quantity of surface active agent will, however, depend somewhat upon the particular agent used, the particular product to be formed and other conditions. For example, good results can be obtained by use of approximately 0.2% of the sodium salt of diamyl naphthalene sulfonic acid, but when red oil is used as the surface active agent, a larger quantity is desirable and amounts as high as 1.5% have given optimum results.

By the use of these agents, when added prior to the beginning of the metathetical reaction by which the final insoluble product is formed, we have been able to obtain improvements in yields amounting to as high as 5% as compared to parallel operations in which the surface active agent is omitted. Thus, by conducting the reaction between zinc chloride and the sodium salt of dimethyl dithiocarbamic acid in the presence of a surface active agent, a very substantial improvement in yield has been obtained in the manufacture of the corresponding zinc salt. A similar improvement in yield may be obtained by practice of the invention in the manufacture of the various other water-insoluble salts of alkyl dithiocarbamic acids discussed above, when formed by reaction with various metal compounds capable of entering into the metathetical reaction by which the desired salt is formed.

While best results in practice of the invention are obtained by adding the surface active agent at a stage at least as early as the beginning of the reaction by which the desired insoluble salt is formed, the advantages of the invention may be obtained at least partially by the introduction of this surface active agent at any stage prior to the completion of the reaction in question. As a matter of fact, the surface active agent may be introduced into practice of the process with advantage at a point even prior to that at which the final metathetical reaction is commenced. Thus, the carbon disulfide, amine and base, which are used to form the original water-soluble salt may be reacted in the presence of the surface active agent, and the resulting reaction mixture may then be treated with the compound containing the desired constituent which imparts insolubility to the salt without removing the surface active agent from this reaction mixture.

Even greater advantages than those discussed above are obtained when the invention is practiced in such a manner as to include the feature covered in the co-pending application of Leslie A. Gillette, Serial No. 542,447, filed June 27, 1944, by inclusion, in addition to the surface active agent, of a water-insoluble compound which is a solvent for the ultimate water-insoluble alkyl dithiocarbamic acid salt. By inclusion of such a solvent, in addition to the surface active agent, we have succeeded not only in obtaining an increase in yield as discussed above, but also in obtaining a product of more granular character, which can be more easily washed, filtered and dried than can products obtained when the special solvent is omitted. As the result of this improved facility in the purifying operation due to use of the special solvent, the product may be economically purified to a condition in which it contains a much smaller proportion of xylene-insoluble impurities than could be obtained with an equivalent amount of purifying treatment if the special solvent were omitted.

In the treatment of the reaction mixture with a solvent in addition to the surface active agent, as discussed above, the solvent may be introduced prior to the beginning of the metathetical reaction, at any time prior to the end of that reaction, or it may even be combined with the constituents of the reaction mixture by which the intermediate water-soluble salt is formed just as in the case of the surface active agent. The special solvent and surface active agent may be introduced at the same or different times, but when both of these materials are used, we prefer to introduce each of them at least prior to completion of the metathetical reaction, and best results are obtained by introducing each of them before the metathetical reaction has begun.

The only qualifications upon the special solvents to be used in the practice of the invention are that they should be relatively inert to the constituents of the reaction mixture and should have the above-mentioned solvent properties. Among the solvents which have been found most satisfactory in this connection are benzene, toluene, ethylene dichloride, butyl chloride, amyl chloride, chloroform, carbon tetrachloride, trichlorethylene, tetrachlorethylene and trichlorethane.

A still further advantage may be attained in practice of the invention by addition to the reaction mixture, prior to the completion of the metathetical reaction, and preferably prior to the beginning thereof, of a viscous oily material adapted to form a coating upon the finished product. Among such materials, white oil and molten paraffin wax are preferred. This feature of addition to the reaction mixture of a material designed to coat the product as that product is precipitated from solution may be employed in conjunction with the use of the wetting agent with or without concurrent use of the feature of employing a water-insoluble solvent for the finished product.

In case of use of the feature of adding an oily coating material to the reaction mixture, such coating material should ordinarily constitute from 1 to 3% based upon the expected weight (by stoichiometric calculation) of the dry product of the reaction. It is undesirable that a very large amount of such coating material be added. In case of use of a special solvent for the resultant product, employed as discussed above, the amount of such solvent should ordinarily be between 3 and 30% based upon the quantity of dry product expected. Excellent results have been obtained by the use of approximately 10% of such solvent.

*Example I*

An aqueous solution of zinc chloride, one-half mole, was added slowly to an agitated solution containing one mole of sodium dibutyldithiocarbamate and 0.24 gram of sodium diamylnaphthalene sulfonate. The product obtained in this manner contained a low percentage of xylene insoluble material and the yield of zinc dibutyldithiocarbamate was 234.5 grams or 99%.

*Example II*

An aqueous solution of zinc chloride, one mole, was added slowly to an agitated solution containing two moles of sodium diethyldithiocarbamate, sodium diamylnaphthalene sulfonate, 0.27 gram, and benzene, 36 grams. The resulting slurry was easily filtered, washed and dried. The zinc diethyldithiocarbamate was of high quality as shown by melting point, xylene extraction and zinc analysis. The yield was 355 grams or 98%.

*Example III*

To an agitated solution containing 2.0 moles of sodium dibutyldithiocarbamate and 5 grams of red oil (impure oleic acid) is added 1.01 moles of an aqueous solution of zinc chloride. A yield of 99% of zinc dibutyldithiocarbamate containing a low percentage of xylene insoluble material is obtained.

*Example IV*

An aqueous solution containing 1.01 moles of zinc chloride is added slowly to an agitated solution containing 2.0 moles of sodium dimethyldithiocarbamate, 3 grams of red oil and 3 grams "white oil" (refined paraffin oil). A yield of 99% of zinc dimethyldithiocarbamate is obtained.

Various modifications are available within the scope of the invention and we do not, therefore,

We claim:
1. In the manufacture of a water-insoluble salt of a methyl dithiocarbamic acid by a process comprising reacting in aqueous solution a water-soluble inorganic salt having a cation chosen from the class consisting of zinc, lead and copper with a water-soluble salt of the methyl dithiocarbamic acid of which the water-insoluble salt is desired, the improvement comprising causing said reaction to take place in said aqueous solution in the presence of a surface active agent and thereby increasing the yield of said water-insoluble salt.

2. In the manufacture of a water-insoluble salt of an ethyl dithiocarbamic acid by a process comprising reacting in aqueous solution a water-soluble inorganic salt having a cation chosen from the class consisting of zinc, lead and copper with a water-soluble salt of the ethyl dithiocarbamic acid of which the water-insoluble salt is desired, the improvement comprising causing said reaction to take place in said aqueous solution in the presence of a surface active agent and thereby increasing the yield of said water-insoluble salt.

3. In the manufacture of a water-insoluble salt of a butyl dithiocarbamic acid by a process comprising reacting in aqueous solution a water-soluble inorganic salt having a cation chosen from the class consisting of zinc, lead and copper with a water-soluble salt of the butyl dithiocarbamic acid of which the water-insoluble salt is desired, the improvement comprising causing said reaction to take place in said aqueous solution in the presence of a surface active agent and thereby increasing the yield of said water-insoluble salt.

4. In the manufacture of a zinc salt of an alkyl dithiocarbamic acid having a maximum of 5 carbon atoms in any alkyl radical by a process comprising reacting in aqueous solution zinc chloride with a sodium salt of the alkyl dithiocarbamic acid of which the zinc salt is desired, the improvement comprising causing said reaction to take place in said aqueous solution in the presence of a surface active agent and thereby increasing the yield of said desired zinc salt.

5. In the manufacture of a zinc salt of an alkyl dithiocarbamic acid having a maximum of 5 carbon atoms in any alkyl radical by a process comprising reacting in aqueous solution a water-soluble inorganic salt containing zinc as a cation with a water-soluble salt of the alkyl dithiocarbamic acid of which the zinc salt is desired, the improvement comprising mixing a surface active agent with said aqueous solution of the reactants prior to completion of the reaction to increase the yield of said desired zinc salt.

6. In the manufacture of a copper salt of an alkyl dithiocarbamic acid having a maximum of 5 carbon atoms in any alkyl radical by a process comprising reacting in aqueous solution a water-soluble inorganic salt containing copper as a cation with a water-soluble salt of the alkyl dithiocarbamic acid of which the copper salt is desired, the improvement comprising causing said reaction to take place in said aqueous solution in the presence of a surface active agent and thereby increasing the yield of said desired copper salt.

7. In the manufacture of a water-insoluble salt of an alkyl dithiocarbamic acid containing a maximum of 5 carbon atoms in any alkyl radical by a process comprising reacting in aqueous solution a water-soluble inorganic salt having a cation chosen from the class consisting of zinc, lead and copper with a water-soluble alkali salt of the alkyl dithiocarbamic acid of which the water-insoluble salt is desired, the improvement comprising mixing a surface active agent with said aqueous solution of the reactants prior to completion of the reaction to increase the yield of said water-insoluble salt.

8. In the manufacture of a water-insoluble salt of an alkyl dithiocarbamic acid containing a maximum of 5 carbon atoms in any alkyl radical by a process comprising reacting in aqueous solution a water-soluble inorganic salt having a cation chosen from the class consisting of zinc, lead and copper with the sodium salt of the alkyl dithiocarbamic acid of which the water-insoluble salt is desired, the improvement comprising causing said reaction to take place in said aqueous solution in the presence of a surface active agent and thereby increasing the yield of said water-insoluble salt.

9. In the manufacture of a water-insoluble salt of an alkyl dithiocarbamic acid having a maximum of 5 carbon atoms in any alkyl radical by a process comprising reacting in aqueous solution a water-soluble inorganic salt having a cation chosen from the class consisting of zinc, lead and copper with a water-soluble salt of the alkyl dithiocarbamic acid, of which the water-insoluble salt is desired, the improvement comprising mixing a surface active agent with said aqueous solution of the reactants prior to completion of the reaction to increase the yield of said water-insoluble salt.

DUDLEY M. GALLAGHER.
LESLIE A. GILLETTE.

REFERENCES CITED

The following references are of record in the file of this patent:

UNITED STATES PATENTS

| Number | Name | Date |
|---|---|---|
| 1,541,433 | Mikaido | June 9, 1945 |
| 1,794,805 | Strosacker et al. | Mar. 3, 1931 |
| 1,836,346 | Thomas | Dec. 15, 1931 |
| 1,847,650 | Immerheiser | May 1, 1932 |
| 1,979,380 | Gardner | Nov. 6, 1934 |
| 2,046,884 | Semon | July 7, 1936 |
| 2,189,383 | Ralston et al. | Feb. 6, 1940 |
| 2,229,562 | Gracia | Jan. 21, 1941 |
| 2,286,738 | Hill | June 16, 1942 |
| 2,331,650 | Blake | Oct. 12, 1943 |
| 2,347,128 | Russell | Apr. 18, 1944 |

OTHER REFERENCES

Ser. No. 415,424, Hopff et al. (A. P. C.), pub. Apr. 20, 1943.